United States Patent
Kim et al.

(10) Patent No.: US 9,810,293 B1
(45) Date of Patent: Nov. 7, 2017

(54) PLANETARY GEAR TRAIN OF AN AUTOMATIC TRANSMISSION FOR A VEHICLE

(71) Applicant: HYUNDAI MOTOR COMPANY, Seoul (KR)

(72) Inventors: Ki Tae Kim, Incheon (KR); Seong Wook Hwang, Gunpo-si (KR); Hyun Sik Kwon, Seoul (KR); Wonmin Cho, Hwaseong-si (KR); Jae Chang Kook, Hwaseong-si (KR); Seongwook Ji, Gunpo-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 15/374,668

(22) Filed: Dec. 9, 2016

(30) Foreign Application Priority Data

Oct. 12, 2016 (KR) .......................... 10-2016-0132413

(51) Int. Cl.
F16H 3/66 (2006.01)

(52) U.S. Cl.
CPC ....... *F16H 3/66* (2013.01); *F16H 2200/0069* (2013.01); *F16H 2200/2012* (2013.01); *F16H 2200/2046* (2013.01); *F16H 2200/2097* (2013.01)

(58) Field of Classification Search
None
See application file for complete search history.

(56) References Cited

U.S. PATENT DOCUMENTS

| 8,932,175 B2* | 1/2015 | Phillips | F16H 3/66 475/282 |
| 9,005,072 B2* | 4/2015 | Mellet | F16H 3/66 475/277 |
| 2011/0009229 A1* | 1/2011 | Bauknecht | F16H 3/66 475/275 |

* cited by examiner

*Primary Examiner* — Erin D Bishop
(74) *Attorney, Agent, or Firm* — Lempia Summerfield Katz LLC

(57) ABSTRACT

Ten forward speeds and one or more reverse speed are achieved by a planetary gear train of an automatic transmission for a vehicle including an input shaft, an output shaft, four planetary gear sets respectively having three rotational elements, and six control elements for selectively interconnecting the rotational elements and a transmission housing.

10 Claims, 2 Drawing Sheets

FIG. 2

| Shift-stage | Control element | | | | | | Gear ratio |
|---|---|---|---|---|---|---|---|
| | C1 | C2 | C3 | C4 | C5 | B1 | |
| D1 | ● | | | | | ● | 3.300 |
| D2 | | ● | ● | | | ● | 2.218 |
| D3 | | | ● | ● | | ● | 1.605 |
| D4 | | ● | | ● | | ● | 1.211 |
| D5 | | ● | ● | ● | | | 1.000 |
| D6 | | ● | ● | ● | ● | | 0.804 |
| D7 | | | ● | ● | ● | | 0.655 |
| D8 | ● | | ● | | ● | | 0.565 |
| D9 | ● | ● | ● | | ● | | 0.506 |
| D10 | | | | ● | ● | | 0.417 |
| REV | ● | | | | ● | | -3.128 |

PLANETARY GEAR TRAIN OF AN AUTOMATIC TRANSMISSION FOR A VEHICLE

CROSS-REFERENCE TO RELATED APPLICATION

This application claims priority to and the benefit of Korean Patent Application No. 10-2016-0132413 filed in the Korean Intellectual Property Office on Oct. 12, 2016, the entire contents of which are incorporated herein by reference.

BACKGROUND

(a) Field

The present embodiments relate to a planetary gear train of an automatic transmission for a vehicle.

(b) Description of the Related Art

In the field of an automatic transmission, more multiplicity of shift-stages is useful technology for enhancement of fuel consumption and drivability of a vehicle. Recently, increase of oil price is triggering a hard competition in enhancing fuel consumption of a vehicle.

In this sense, research for an engine has been made to achieve weight reduction and to enhance fuel consumption by downsizing, and research on an automatic transmission has been performed to simultaneously provide better drivability and fuel consumption by achieving more shift stages.

In order to achieve more shift-stages for an automatic transmission, the number of parts is typically increased, which may deteriorate installability, production cost, weight and/or power flow efficiency.

Therefore, in order to maximally enhance fuel consumption of an automatic transmission having more shift-stages, it is important that better efficiency is derived by less number of parts.

In this background, an eight-speed automatic transmission has been introduced recently, and a planetary gear train for an automatic transmission enabling more shift-stages is under investigation.

An automatic transmission of eight or more shift-stages typically includes three to four planetary gear sets and five to seven control elements (e.g., frictional elements), and may easily become lengthy, thereby deteriorating installability.

In this regard, disposing planetary gear sets in parallel or employing dog clutches instead of wet-type control elements is sometimes attempted. However, such an arrangement may not be widely applicable, and using dog clutches may easily deteriorate shift-feel.

The above information disclosed in this Background section is only for enhancement of understanding of the background of the present embodiments, and therefore, the Background section may contain information that does not form the prior art that is already known in this country to a person of ordinary skill in the art.

SUMMARY

The present embodiments have been made in an effort to provide a planetary gear train of an automatic transmission for a vehicle having advantages of obtaining shift-stages of ten forward speeds and one reverse speed by minimal number of parts, improving power delivery performance and fuel consumption by multi-stages of an automatic transmission, and improving driving stability of a vehicle by utilizing a low rotation speed of an engine.

A planetary gear train according to an embodiment includes an input shaft for receiving an engine torque, an output shaft for outputting a shifted torque, a first planetary gear set having first, second, and third rotational elements, and a second planetary gear set having fourth, fifth, and sixth rotational elements. The planetary gear train also includes a third planetary gear set having seventh, eighth, and ninth rotational elements, and a fourth planetary gear set having tenth, eleventh, and twelfth rotational elements. The planetary gear train includes a first shaft connected with the first rotational element, a second shaft connected with the second rotational element, the fifth rotational element, the eleventh rotational element and connected with the input shaft. The planetary gear train also includes a third shaft connected with the third rotational element, a fourth shaft connected with the fourth rotational element, and a fifth shaft connected with the sixth rotational element and connected with the transmission housing. The planetary gear train includes a sixth shaft connected with the seventh rotational element and selectively connected with the first shaft and the third shaft, respectively, and a seventh shaft connected with the eighth rotational element and the twelfth rotational element, and connected with the output shaft. The planetary gear train also includes an eighth shaft connected with the ninth rotational element, and selectively connected with the first shaft and the fourth shaft respectively, and a ninth shaft connected with the tenth rotational element and selectively connected with the third shaft.

The eighth shaft may be selectively connected with the transmission housing.

The first, second, and third rotational elements of the first planetary gear set may be, respectively, a first sun gear, a first planet carrier, and a first ring gear of the first planetary gear set. The fourth, fifth, and sixth rotational elements of the second planetary gear set may be, respectively, a second sun gear, a second planet carrier, and a second ring gear of the second planetary gear set. The seventh, eighth, and ninth rotational elements of the third planetary gear set may be, respectively, a third sun gear, a third planet carrier, and a third ring gear of the third planetary gear set. The tenth, eleventh, and twelfth rotational elements of the fourth planetary gear set may be respectively a fourth sun gear, a fourth planet carrier, and a fourth ring gear of the fourth planetary gear set.

The first, second, third, and fourth planetary gear sets may be arranged in an order of the first, second, third, and fourth planetary gear sets from an engine side.

A planetary gear train according to an embodiment may further include a first clutch selectively connecting the first shaft and the sixth shaft, a second clutch selectively connecting the first shaft and the eighth shaft, a third clutch selectively connecting the third shaft and the sixth shaft, a fourth clutch selectively connecting the third shaft and the ninth shaft, a fifth clutch selectively connecting the fourth shaft and the eighth shaft, and a first brake selectively connecting the eighth shaft and the transmission housing.

A planetary gear train according to an embodiment may realize at least ten forward speeds and at least one reverse speed by operating the four planetary gear sets of simple planetary gear sets by controlling six control elements.

In addition, a planetary gear train according to an embodiment may substantially improve driving stability by realizing shift-stages appropriate for rotation speed of an engine due to multi-stages of an automatic transmission.

In addition, a planetary gear train according to an embodiment maximizes engine driving efficiency by multi-stages of an automatic transmission, and may improve power delivery performance and fuel consumption.

Further, effects that may be obtained or expected from embodiments are directly or suggestively described in the following detailed description. Various effects expected from embodiments will be described in the following detailed description.

BRIEF DESCRIPTION OF THE DRAWINGS

FIG. 2 is an operational chart for respective control elements at respective shift-stages in a planetary gear train according to an embodiment.

DETAILED DESCRIPTION

Figure 1:
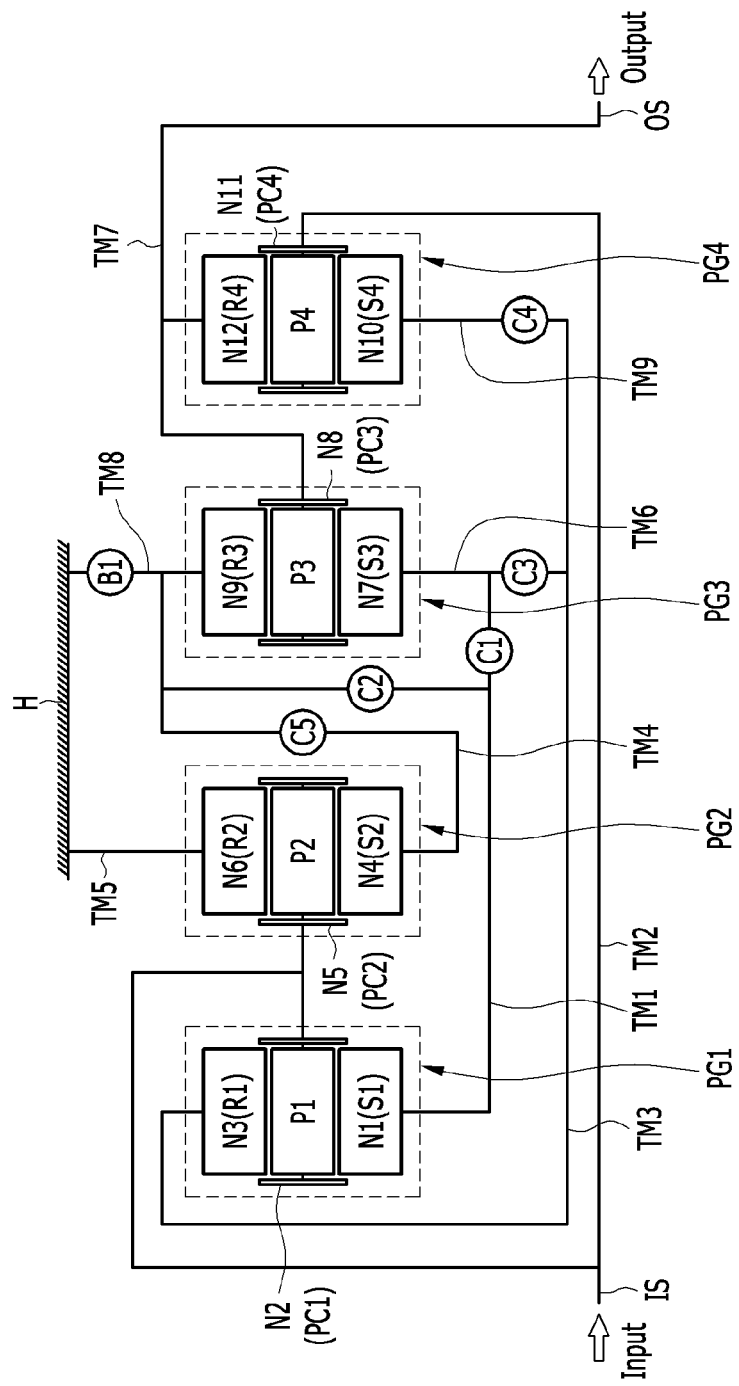
FIG. 1 is a schematic diagram of a planetary gear train according to an embodiment.

The present embodiments will be described more fully hereinafter with reference to the accompanying drawings, in which embodiments are shown.

The drawings and description are to be regarded as illustrative in nature and not restrictive, and like reference numerals designate like elements throughout the specification.

In the following description, dividing names of components into first, second and the like is to divide the names because the names of the components are the same as each other and an order thereof is not particularly limited.

FIG. 1 is a schematic diagram of a planetary gear train according to an embodiment.

Referring to FIG. 1, a planetary gear train according to an embodiment includes first, second, third, and fourth planetary gear sets PG1, PG2, PG3, and PG4 arranged on a same axis, input shaft IS, and output shaft OS. The planetary gear train also includes nine shafts TM1 to TM9 connected with rotational elements of the first, second, third, and fourth planetary gear sets PG1, PG2, PG3, and PG4, control elements of five clutches C1 to C5 and one brake B1, and a transmission housing H.

Torque input from the input shaft IS is shifted by cooperative operation of the first, second, third, and fourth planetary gear sets PG1, PG2, PG3, and PG4, and then output through the output shaft OS.

The planetary gear sets are arranged in the order of first, second, third, and fourth planetary gear sets PG1, PG2, PG3, and PG4, from an engine side.

The input shaft IS is an input member, and the torque from a crankshaft of an engine is input into the input shaft IS, after being torque-converted through a torque converter.

The output shaft OS is an output member and being arranged on a same axis with the input shaft IS, delivers a shifted driving torque to a drive shaft through a differential apparatus (not shown).

The first planetary gear set PG1 is a single pinion planetary gear set and includes a first sun gear S1, a first planet carrier PC1 that rotatably supports a plurality of first pinion gears P1 externally gear-meshed with the first sun gear S1, and a first ring gear R1 that is internally gear-meshed with the plurality of first pinion gears P1. The first sun gear S1 acts as a first rotational element N1, the first planet carrier PC1 acts as a second rotational element N2, and the first ring gear R1 acts as a third rotational element N3.

The second planetary gear set PG2 is a single pinion planetary gear set and includes a second sun gear S2, a second planet carrier PC2 that rotatably supports a plurality of second pinion gears P2 externally gear-meshed with the second sun gear S2, and second ring gear R2 that is internally gear-meshed with the plurality of second pinion gears P2. The second sun gear S2 acts as a fourth rotational element N4, the second planet carrier PC2 acts as a fifth rotational element N5, and the second ring gear R2 acts as a sixth rotational element N6.

The third planetary gear set PG3 is a single pinion planetary gear set and includes a third sun gear S3, a third planet carrier PC3 that rotatably supports a plurality of third pinion gears P3 externally gear-meshed with the third sun gear S3, and a third ring gear R3 that is internally gear-meshed with the plurality of third pinion gears P3. The third sun gear S3 acts as a seventh rotational element N7, the third planet carrier PC3 acts as an eighth rotational element N8, and the third ring gear R3 acts as a ninth rotational element N9.

The fourth planetary gear set PG4 is a single pinion planetary gear set and includes a fourth sun gear S4, a fourth planet carrier PC4 that rotatably supports a plurality of fourth pinion gears P4 externally gear-meshed with the fourth sun gear S4, and a fourth ring gear R4 that is internally gear-meshed with the plurality of fourth pinion gears P4. The fourth sun gear S4 acts as a tenth rotational element N10, the fourth planet carrier PC4 acts as an eleventh rotational element N11, and the fourth ring gear R4 acts as a twelfth rotational element N12.

In the arrangement of the first, second, third, and fourth planetary gear sets PG1, PG2, PG3, and PG4, the second rotational element N2, the fifth rotational element N5, and the eleventh rotational element N11 are directly connected, and the eighth rotational element N8 and the twelfth rotational element N12 are directly connected, by nine shafts TM1 to TM9.

The nine shafts TM1 to TM9 are arranged as follows.

Each of the nine shafts TM1 to TM9 may be a rotational member that directly interconnects the input and output shafts and rotational elements of the planetary gear sets PG1, PG2, PG3, and PG4, or may be a rotational member that selectively interconnects a rotational element to the transmission housing H, or may be a fixed member fixed to the transmission housing H.

The first shaft TM1 is connected with the first rotational element N1 (e.g., first sun gear S1).

The second shaft TM2 is connected with the second rotational element N2 (e.g., first planet carrier PC1), the fifth rotational element N5 (e.g., second planet carrier PC2), and the eleventh rotational element N11 (e.g., fourth planet carrier PC4), and is directly connected with the input shaft IS, thereby always acting as an input element.

The third shaft TM3 is connected with the third rotational element N3 (e.g., first ring gear R1).

The fourth shaft TM4 is connected with the fourth rotational element N4 (e.g., second sun gear S2).

The fifth shaft TM5 is connected with the sixth rotational element N6 (e.g., second ring gear R2), and is directly connected with the transmission housing H, thereby always acting as a fixed element.

The sixth shaft TM6 is connected with the seventh rotational element N7 (e.g., third sun gear S3), and is selectively connected with the first shaft TM1 and the third shaft TM3, respectively.

The seventh shaft TM7 is connected with the eighth rotational element N8 (e.g., third planet carrier PC3) and the twelfth rotational element N12 (e.g., fourth ring gear R4), and is connected with the output shaft OS, thereby always acting as an output element.

The eighth shaft TM8 is connected with the ninth rotational element N9 (e.g., third ring gear R3), selectively connected with the first shaft TM1 and the fourth shaft TM4, respectively, and is selectively connected with the transmission housing H, thereby selectively acting as a fixed element.

The ninth shaft TM9 is connected with the tenth rotational element N10 (e.g., fourth sun gear S4), and is selectively connected with the third shaft TM3.

The nine shafts TM1 to TM9, the input shaft IS, and the output shaft OS may be selectively interconnected with one another by control elements of five clutches C1, C2, C3, C4, and C5.

The nine shafts TM1 to TM9 may be selectively connected with the transmission housing H by control elements of one brake B1.

The five clutches C1 to C5 and the one brake B1 are arranged as follows.

The first clutch C1 is arranged between the first shaft TM1 and the sixth shaft TM6, and selectively connects the first shaft TM1 and the sixth shaft TM6, thereby controlling power delivery therebetween.

The second clutch C2 is arranged between the first shaft TM1 and the eighth shaft TM8, and selectively connects the first shaft TM1 and the eighth shaft TM8, thereby controlling power delivery therebetween.

The third clutch C3 is arranged between the third shaft TM3 and the sixth shaft TM6, and selectively connects the third shaft TM3 and the sixth shaft TM6, thereby controlling power delivery therebetween.

The fourth clutch C4 is arranged between the third shaft TM3 and the ninth shaft TM9, and selectively connects the third shaft TM3 and the ninth shaft TM9, thereby controlling power delivery therebetween.

The fifth clutch C5 is arranged between the fourth shaft TM4 and the eighth shaft TM8, and selectively connects the fourth shaft TM4 and the eighth shaft TM8, thereby controlling power delivery therebetween.

The first brake B1 is arranged between the eighth shaft TM8 and the transmission housing H, and selectively connects the eighth shaft TM8 to the transmission housing H.

The control elements of the first, second, and third clutch C1, C2, and C3 and the first, second, and third brake B1, B2, and B3 may be realized as multi-plate hydraulic pressure friction devices that are frictionally engaged by hydraulic pressure.

FIG. 2 is an operational chart for respective control elements at respective shift-stages in a planetary gear train according to an embodiment.

Referring to FIG. 2, a planetary gear train according to an embodiment realizes ten forward speeds and one reverse speed by operating three control elements among the first, second, third, fourth, and fifth clutches C1, C2, C3, C4, and C5 and the first brake B1 at respective shift-stages.

In the forward first speed D1, the first and third clutches C1 and C3 and the first brake B1 are simultaneously operated.

As a result, the first shaft TM1 is connected with the sixth shaft TM6 by the operation of the first clutch C1, and the third shaft TM3 is connected with the sixth shaft TM8 by the operation of the third clutch C3. In this state, the torque of the input shaft IS is input to the second shaft TM2.

In addition, while the fifth shaft TM5 always acts as a fixed element, the eighth shaft TM8 acts as a fixed element by the operation of the first brake B1, thereby realizing the forward first speed by cooperative operation of respective shafts and outputting a shifted torque to the output shaft OS connected with the seventh shaft TM7.

In the forward second speed D2, the second and third clutches C2 and C3 and the first brake B1 are simultaneously operated.

As a result, the first shaft TM1 is connected with the eighth shaft TM8 by the operation of the second clutch C2, and the third shaft TM3 is connected with the sixth shaft TM6 by the operation of the third clutch C3. In this state, the torque of the input shaft IS is input to the second shaft TM2.

In addition, while the fifth shaft TM5 always acts as a fixed element, the eighth shaft TM8 acts as a fixed element by the operation of the first brake B1, thereby realizing the forward second speed by cooperative operation of respective shafts and outputting a shifted torque to the output shaft OS connected with the seventh shaft TM7.

In the forward third speed D3, the third and fourth clutches C3 and C4 and the first brake B1 are simultaneously operated.

As a result, the third shaft TM3 is connected with the sixth shaft TM6 by the operation of the third clutch C3, and the third shaft TM3 is connected with the ninth shaft TM9 by the operation of the fourth clutch C4. In this state, the torque of the input shaft IS is input to the second shaft TM2.

In addition, while the fifth shaft TM5 always acts as a fixed element, the eighth shaft TM8 acts as a fixed element by the operation of the first brake B1, thereby realizing the forward third speed by cooperative operation of respective shafts and outputting a shifted torque to the output shaft OS connected with the seventh shaft TM7.

In the forward fourth speed D4, the second and fourth clutches C2 and C4 and the first brake B1 are simultaneously operated.

As a result, the first shaft TM1 is connected with the eighth shaft TM8 by the operation of the second clutch C2, and the third shaft TM3 is connected with the ninth shaft TM9 by the operation of the fourth clutch C4. In this state, the torque of the input shaft IS is input to the second shaft TM2.

In addition, while the fifth shaft TM5 always acts as a fixed element, the eighth shaft TM8 acts as a fixed element by the operation of the first brake B1, thereby realizing the forward fourth speed by cooperative operation of respective shafts and outputting a shifted torque to the output shaft OS connected with the seventh shaft TM7.

In the forward fifth speed D5, the second, third, and fourth clutches C2, C3, and C4 are simultaneously operated.

As a result, the first shaft TM1 is connected with the eighth shaft TM8 by the operation of the second clutch C2, the third shaft TM3 is connected with the sixth shaft TM6 by the operation of the third clutch C3, and the third shaft TM3 is connected with the ninth shaft TM9 by the operation of the fourth clutch C4. In this state, the torque of the input shaft IS is input to the second shaft TM2.

In this case, the first, third, and fourth planetary gear sets PG1, PG3, and PG4 integrally rotate, and the fifth shaft always acts as a fixed element. Thereby, a torque inputted through the second shaft TM2 is outputted as inputted, thereby forming the forward fifth speed and outputting a shifted torque to the output shaft OS connected with the seventh shaft TM7.

In the forward sixth speed D6, the second, fourth, and fifth clutches C2, C4, and C5 are simultaneously operated.

As a result, the first shaft TM1 is connected with the eighth shaft TM8 by the operation of the second clutch C2, the third shaft TM3 is connected with the ninth shaft TM9 by the operation of the fourth clutch C4, and the fourth shaft TM4 is connected with the eighth shaft TM8 by the operation of the fifth clutch C5. In this state, the torque of the input shaft IS is input to the second shaft TM2.

In addition, the fifth shaft TM5 always acts as a fixed element, thereby realizing the forward sixth speed, which is an overdrive gear, by cooperative operation of respective shafts and outputting a shifted torque to the output shaft OS connected with the seventh shaft TM7.

In the forward seventh speed D7, the third, fourth, and fifth clutches C3, C4, and C5 are simultaneously operated.

As a result, the third shaft TM3 is connected with the sixth shaft TM6 by the operation of the third clutch C3, the third shaft TM3 is connected with the ninth shaft TM9 by the operation of the fourth clutch C4, and the fourth shaft TM4 is connected with the eighth shaft TM8 by the operation of the fifth clutch C5. In this state, the torque of the input shaft IS is input to the second shaft TM2.

In addition, the fifth shaft TM5 always acts as a fixed element, thereby realizing the forward seventh speed, which is an overdrive gear, by cooperative operation of respective shafts and outputting a shifted torque to the output shaft OS connected with the seventh shaft TM7.

In the forward eighth speed D8, the second, third, and fifth clutches C2, C3, and C5 are simultaneously operated.

As a result, the first shaft TM1 is connected with the eighth shaft TM8 by the operation of the second clutch C2, the third shaft TM3 is connected with the sixth shaft TM6 by the operation of the third clutch C3, and the fourth shaft TM4 is connected with the eighth shaft TM8 by the operation of the fifth clutch C5. In this state, the torque of the input shaft IS is input to the second shaft TM2.

In addition, the fifth shaft TM5 always acts as a fixed element, thereby realizing the forward eighth speed, which is an overdrive gear, by cooperative operation of respective shafts and outputting a shifted torque to the output shaft OS connected with the seventh shaft TM7.

In the forward ninth speed D9, the first, third, and fifth clutches C1, C3, and C5 are simultaneously operated.

As a result, the first shaft TM1 is connected with the sixth shaft TM6 by the operation of the first clutch C1, the third shaft TM3 is connected with the sixth shaft TM8 by the operation of the third clutch C3, and the fourth shaft TM4 is connected with the eighth shaft TM8 by the operation of the fifth clutch C5. In this state, the torque of the input shaft IS is input to the second shaft TM2.

In addition, the fifth shaft TM5 always acts as a fixed element, thereby realizing the forward ninth speed, which is an overdrive gear, by cooperative operation of respective shafts and outputting a shifted torque to the output shaft OS connected with the seventh shaft TM7.

In the forward tenth speed D10, the first, second, and fifth clutches C1, C2, and C5 are simultaneously operated.

As a result, the first shaft TM1 is connected with the sixth shaft TM6 by the operation of the first clutch C1, the first shaft TM1 is connected with the eighth shaft TM8 by the operation of the second clutch C2, and the fourth shaft TM4 is connected with the eighth shaft TM8 by the operation of the fifth clutch C5. In this state, the torque of the input shaft IS is input to the second shaft TM2.

In addition, the fifth shaft TM5 always acts as a fixed element, thereby realizing the forward tenth speed, which is a highest gear, by cooperative operation of respective shafts and outputting a shifted torque to the output shaft OS connected with the seventh shaft TM7.

In the reverse speed REV, the first, fourth, and fifth clutches C1, C4, and C5 are simultaneously operated.

As a result, the first shaft TM1 is connected with the sixth shaft TM6 by the operation of the first clutch C1, the third shaft TM3 is connected with the ninth shaft TM9 by the operation of the fourth clutch C4, and the fourth shaft TM4 is connected with the eighth shaft TM8 by the operation of the fifth clutch C5. In this state, the torque of the input shaft IS is input to the second shaft TM2.

In addition, the fifth shaft TM5 always acts as a fixed element, thereby realizing the reverse speed by cooperative operation of respective shafts and outputting a shifted torque to the output shaft OS connected with the seventh shaft TM7.

As described above, a planetary gear train according to an embodiment may realize forward tenth speed and one reverse speed by operating the four planetary gear sets PG1, PG2, PG3, and PG4 by controlling the five clutches C1, C2, C3, C4, and C5 and the one brakes B1.

In addition, a planetary gear train according to an embodiment may realize shift stages appropriate for rotation speed of an engine due to multi-stages of an automatic transmission and improve driving stability of a vehicle by utilizing a low rotation speed of an engine.

In addition, a planetary gear train according to an embodiment maximizes engine driving efficiency by multi-stages of an automatic transmission, and may improve power delivery performance and fuel consumption. While this invention has been described in connection with what is presently considered to be practical embodiments, it is to be understood that the invention is not limited to the disclosed embodiments. The invention is intended to cover various modifications and equivalent arrangements included within the spirit and scope of the appended claims.

What is claimed is:
1. A planetary gear train of an automatic transmission for a vehicle, the planetary gear train comprising:
   an input shaft for receiving an engine torque;
   an output shaft for outputting a shifted torque;
   a first planetary gear set having a first rotational element, a second rotational element, and a third rotational element;
   a second planetary gear set having a fourth rotational element, a fifth rotational element, and a sixth rotational element;
   a third planetary gear set having a seventh rotational element, an eighth rotational element, and a ninth rotational element;
   a fourth planetary gear set having a tenth rotational element, an eleventh rotational element, and a twelfth rotational element;
   a first shaft fixedly connected with the first rotational element;
   a second shaft fixedly connected with the second rotational element, the fifth rotational element, the eleventh rotational element, and the input shaft, such that the second, fifth, and eleventh rotational elements always rotate at a speed of the input shaft;
   a third shaft fixedly connected with the third rotational element;
   a fourth shaft fixedly connected with the fourth rotational element;
   a fifth shaft fixedly connected with the sixth rotational element and a transmission housing, such that the sixth rotational element is always stationary;

a sixth shaft fixedly connected with the seventh rotational element and selectively connected with the first shaft and the third shaft, respectively;

a seventh shaft fixedly connected with the eighth rotational element the twelfth rotational element, and the output shaft, such that the eighth and twelfth rotational elements always rotate at a speed of the output shaft;

an eighth shaft fixedly connected with the ninth rotational element, and selectively connected with the first shaft and the fourth shaft, respectively; and a ninth shaft fixedly connected with the tenth rotational element and selectively connected with the third shaft.

2. The planetary gear train of claim 1, wherein the eighth shaft is selectively connected with the transmission housing.

3. The planetary gear train of claim 1, wherein:
the first rotational element, the second rotational element, and the third rotational element of the first planetary gear set are, respectively, a first sun gear, a first planet carrier, and a first ring gear of the first planetary gear set;
the fourth rotational element, the fifth rotational element, and the sixth rotational element of the second planetary gear set are, respectively, a second sun gear, a second planet carrier, and a second ring gear of the second planetary gear set;
the seventh rotational element, the eighth rotational element, and the ninth rotational element of the third planetary gear set are, respectively, a third sun gear, a third planet carrier, and a third ring gear of the third planetary gear set; and
the tenth rotational element, the eleventh rotational element, and the twelfth rotational element of the fourth planetary gear set are, respectively, a fourth sun gear, a fourth planet carrier, and a fourth ring gear of the fourth planetary gear set.

4. The planetary gear train of claim 1, wherein the first planetary gear set, the second planetary gear set, the third planetary gear set, and the fourth planetary gear set are arranged in an order of the first planetary gear set, the second planetary gear set, the third planetary gear set, and the fourth planetary gear set from an engine side.

5. The planetary gear train of claim 2, further comprising:
a first clutch selectively connecting the first shaft and the sixth shaft;
a second clutch selectively connecting the first shaft and the eighth shaft;
a third clutch selectively connecting the third shaft and the sixth shaft;
a fourth clutch selectively connecting the third shaft and the ninth shaft;
a fifth clutch selectively connecting the fourth shaft and the eighth shaft; and
a first brake selectively connecting the eighth shaft and the transmission housing.

6. A planetary gear train of an automatic transmission for a vehicle, the planetary gear train comprising:
an input shaft for receiving an engine torque;
an output shaft for outputting a shifted torque;
a first planetary gear set having a first rotational element, a second rotational element, and a third rotational element;
a second planetary gear set having a fourth rotational element, a fifth rotational element, and a sixth rotational element;
a third planetary gear set having a seventh rotational element, an eighth rotational element, and a ninth rotational element; and a fourth planetary gear set having a tenth rotational element, an eleventh rotational element, and a twelfth rotational element,
wherein:
the input shaft is fixedly connected with the second rotational element,
the output shaft is fixedly connected with the twelfth rotational element,
the second rotational element is fixedly connected with the fifth rotational element and the eleventh rotational element, such that the second, fifth, and eleventh rotational elements always rotate at a same speed,
the eighth rotational element is fixedly connected with the twelfth rotational element, such that the eighth and twelfth rotational elements always rotate at a same speed,
the first rotational element is selectively connected with the seventh rotational element and the ninth rotational element, respectively,
the third rotational element is selectively connected with the seventh rotational element and the tenth rotational element, respectively,
the fourth rotational element is selectively connected with the ninth rotational element, and
the sixth rotational element is fixedly connected with a transmission housing, such that the sixth rotational element is always stationary.

7. The planetary gear train of claim 6, wherein the ninth rotational element is selectively connected with the transmission housing.

8. The planetary gear train of claim 6, wherein:
the first rotational element, the second rotational element, and the third rotational element of the first planetary gear set are, respectively, a first sun gear, a first planet carrier, and a first ring gear of the first planetary gear set;
the fourth rotational element, the fifth rotational element, and the sixth rotational element of the second planetary gear set are, respectively, a second sun gear, a second planet carrier, and a second ring gear of the second planetary gear set;
the seventh rotational element, the eighth rotational element, and the ninth rotational element of the third planetary gear set are, respectively, a third sun gear, a third planet carrier, and a third ring gear of the third planetary gear set; and
the tenth rotational element, the eleventh rotational element, and the twelfth rotational element of the fourth planetary gear set are, respectively, a fourth sun gear, a fourth planet carrier, and a fourth ring gear of the fourth planetary gear set.

9. The planetary gear train of claim 6, wherein the first planetary gear set, the second planetary gear set, the third planetary gear set, and the fourth planetary gear set are arranged in an order of the first planetary gear set, the second planetary gear set, the third planetary gear set, and the fourth planetary gear set from an engine side.

10. The planetary gear train of claim 7, further comprising:
a first clutch selectively connecting the first rotational element and the seventh rotational element;
a second clutch selectively connecting the first rotational element and the ninth rotational element;
a third clutch selectively connecting the third rotational element and the seventh rotational element;

a fourth clutch selectively connecting the third rotational element and the tenth rotational element;
a fifth clutch selectively connecting the fourth rotational element and the ninth rotational element; and
a first brake selectively connecting the ninth rotational element and the transmission housing.

\* \* \* \* \*